United States Patent Office 3,461,033
Patented Aug. 12, 1969

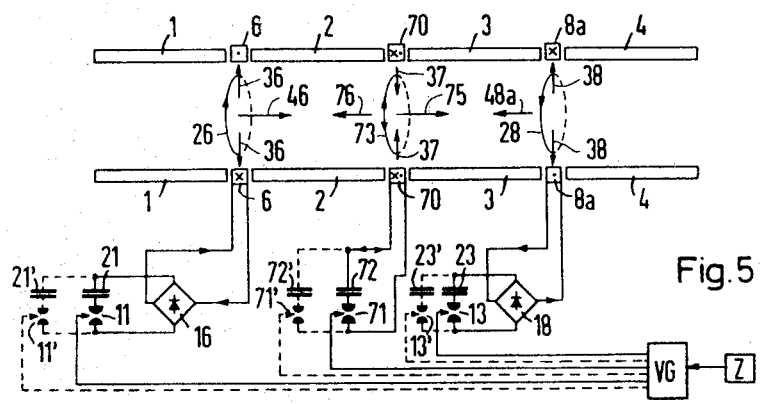
Fig. 5
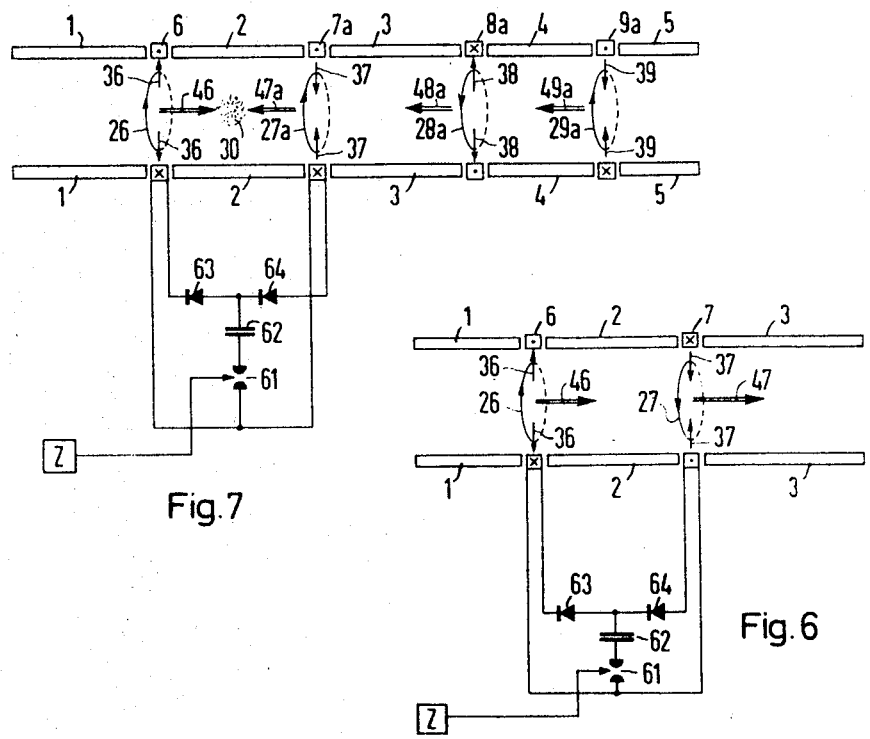
Fig. 7
Fig. 6

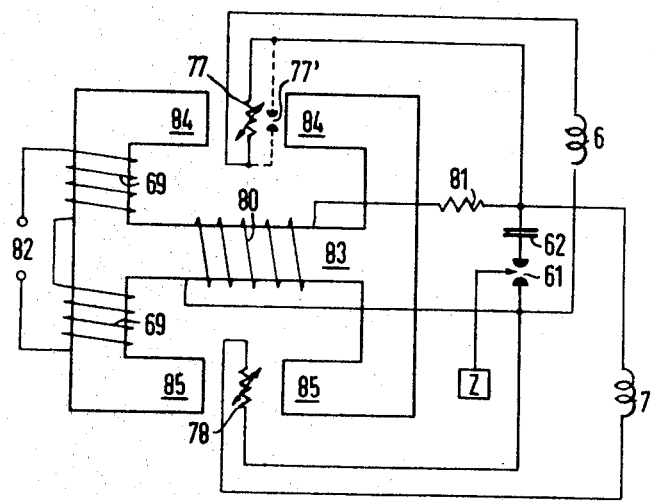
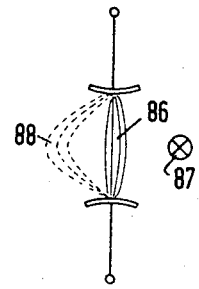
Fig. 14
Fig. 13
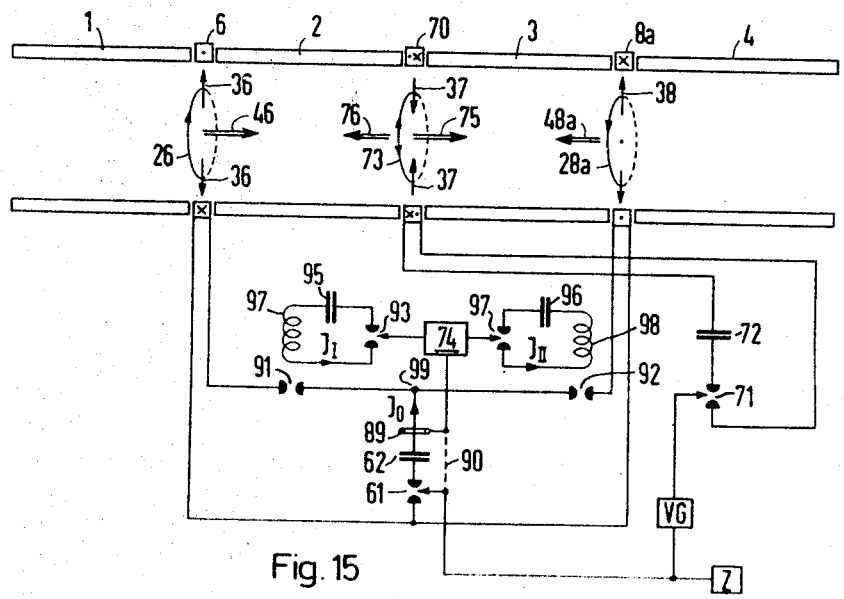
Fig. 15

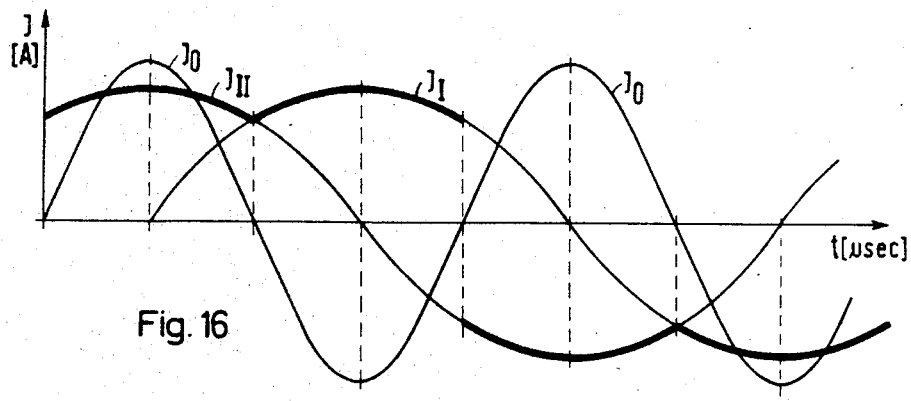
Fig. 16
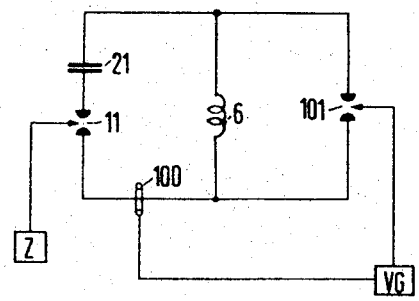
Fig. 17
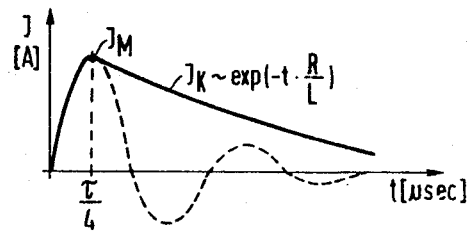
Fig. 18
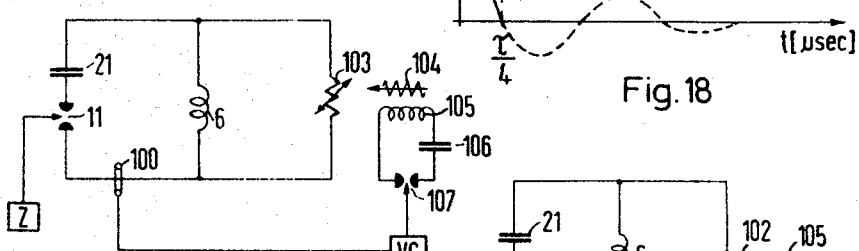
Fig. 19
Fig. 20
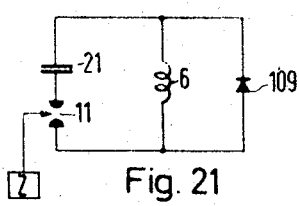
Fig. 21

3,461,033
ELECTRICAL APPARATUS FOR ELECTROMAGNETIC CONTROL OF PLASMOIDS
Alfred Michel and Heinrich Schindler, Erlangen, Germany, assignors to Siemens Aktiengesellschaft, Erlangen, Germany, a corporation of Germany
Filed Aug. 24, 1966, Ser. No. 574,690
Claims priority, application Germany, Aug. 28, 1965, S 99,115
Int. Cl. G21b 1/00
U.S. Cl. 176—3                     19 Claims

ABSTRACT OF THE DISCLOSURE

Apparatus for electromagnetic control of plasmoids includes an energizing system comprising electric circuit means connected to at least two magnetic field coils magnetically opposed to each other and surrounding a tubular vessel in coaxial relation thereto, capacitor means, control means for periodically causing oscillating discharges of the capacitor means and a capacitor discharge circuit connected to the capacitor means and having an asymmetrically conducting portion which includes an induction winding coaxially surrounding the tubular vessel between the field coils.

---

Our invention relates to apparatus for confining plasma or plasmoids by magnetic field effects which keep the plasma away from wall structure as the plasma temperature is increased or maintained.

In a more particular aspect, our invention concerns apparatus for producing or accelerating plasmoids without the aid of electrodes by means of electromagnetic confining and accelerating fields. More specifically, our invention is an improvement over apparatus of the type described and claimed in U.S. Patent No. 3,270,236, issued August 30, 1966 to A. Koller et al., assigned to the assignee of the present invention.

When plasma is being magnetically confined by a method of the stationary type, there occur diffusion losses and instabilities. These can be reduced by applying a method for dynamically accelerating or confining the plasma, for example in the manner and by the means described and explained in the patent just mentioned. The dynamic confinement involves alternately accelerating and delaying the plasma by the effect of electrical and magnetical fields. The energy required for such operation is largely converted to heat during the period of confinement and thus serves to simultaneously heat the plasma and to compensate for energy losses.

The process and equipment for acceleration and dynamically confinement of plasma disclosed in the above-mentioned patent operates with an arrangement of two coaxial magnetic field coils of mutually opposed winding sense or opposed magnetic action. The coils are seated upon a tubular vessel of insulating material in axially spaced relation to each other so that, when the two field coils are electrically excited, a magnetic field having a biconical, pointed configuration, called cusp field, is produced in the space between the two coils. Located between the two field coils is a coaxial low-induction winding which also surrounds the insulating tubular vessel. The two field coils are excited while simultaneously an ionized gas (plasma) is brought into the plane of the induction winding. When thereafter the strength of the magnetic cusp field has reached its maximum, the induction winding is electrically excited by a pulse of short duration relative to the excitation time of the field coils.

Arranging two or more of the above-described coils and windings in sequence affords the possibility of subjecting an accelerated plasmoid to another or repeated acceleration, or decelerating it and/or reflecting it. As is also described in the patent, a plasma may be thrown periodically back and forth between two of the above-described arrangements, thus dynamically confining the plasma. The induction winding participating in the plasma acceleration is excited by discharge of a capacitor. With an oscillatory capacitor discharge, the plasma is accelerated alternately in opposite axial directions corresponding to the change in the direction of the current flowing through the induction winding.

It is further described in the above-mentioned patent that an individual plasmoid can be accelerated at a given time in a predetermined direction. This, according to the patent, can be effected only by critical or super-critical damping of the pulse current supplied to the induction winding. This type of acceleration in a predetermined direction, however, entails appreciable disadvantages. Among these is the fact that the necessary damping of the pulse current not only eliminates, as desired, the periodicity of the current but also greatly reduces its amplitude. Consequently the oriented acceleration is achieved only at the expense of very large energy losses in the damping resistance.

It is an object of our present invention to provide plasma control apparatus generally of the above-mentioned type that afford controlling the plasma in such a manner that it is ejected in a predetermined direction at considerably smaller or virtually negligible losses, namely under conditions which result in converting the supplied energy to a great extent into kinetic energy or heating of the plasma. The utility of the apparatus of our invention is the production of heat in controlled thermonuclear reactions as described, for example, in "Project Sherwood—the U.S. Program in Controlled Fusion" by Amasa S. Bishop, Doubleday & Company, Inc., Garden City, N.Y., 1960.

Accordingly, our invention requires providing an apparatus for accelerating and/or dynamically confining and heating of plasmoids with the aid of magnetic cusp fields produced by excitation of two coaxial and axially spaced field coils mounted on the tubular insulating vessel and acting magnetically in opposition to each other, for example by virtue of a mutually opposed winding sense, such apparatus having an induction winding coaxially located in the space between the two field windings and excited by capacitor discharge at the moment when the field strength of the cusp field attains its maximum. Relating to such apparatus and in accordance with an essential feature of our invention, we provide the excitation circuit of the induction winding with asymetrical conductance means so that induction winding is traversed by current in a single direction during the interval in which the oscillating discharge of the capacitor takes place.

According to another feature of our invention, relating to a plasma control apparatus with two or more of the above-mentioned induction windings sequentially following each other along the tubular insulating vessel, each individual induction winding is traversed by current in a single constant direction opposed to the direction of current flow in each adjacent induction winding.

According to still another feature of the invention, an apparatus for dynamically confining and heating of plasmoids is equipped with two induction windings which during the interval of an oscillating capacitor discharge are traversed by current in the same single direction.

If a plasma confining apparatus according to the invention possesses three induction windings, the two outer induction windings are traversed by current in constant directions opposed to each other, whereas the current in the intermediate induction winding may oscillate, each of the three induction windings being located between two field coils.

In the same manner as in apparatus according to the above-mentioned patent, plasma may be accelerated or confined in equipment according to the present invention with the aid of any number of sequential stages, each being a field stage identified by the diametrical center plane of one of the induction windings surrounding the insulating tubular vessel. The insulating vessel need not be straight but may have toroidal shape, for example.

A system according to the invention is applicable as an independent accelerator for plasmoids or for an independent plasma confining apparatus. Furthermore, an apparatus according to the above-mentioned patent may be employed serially ahead of a plasma accelerator according to the present invention. Furthermore, an apparatus according to the above-mentioned patent may also be located serially on both axial sides of the vessel which forms part of a plasma confining apparatus according to the present invention.

According to a preferred embodiment of the invention, each of the induction windings traversed by current in only one direction is connected with the energizing capacitor through a full-wave rectifier network of the bridge (Graetz) type. If desired, the rectifier fullwave bridge network may also be composed of components having variable resistance and be provided with means for controlling the resistance of the components in the rhythm of the capacitor discharge. Such components may consist, for example, of magnetic-field responsive semiconducting resistors, also called galvanomagnetic resistors or field plates. These are inserted, for example, into a magnetic circuit excited and premagnetized by an electric circuit which is traversed by current simultaneously with the induction winding. As a result, the galvanomagnetic resistors are alternately and pairwise high-ohmic and low-ohmic in successive positive and negative half-waves of the capacitor discharge or vice versa. Applicable in lieu of galvanomagnetic semiconducting resistors are spark gaps subjected to magnetic blowing, so that the resistance value of the spark gaps is controlled by a magnetic field which controls the blowing action.

In another embodiment of apparatus according to the invention, the induction winding traversed by current in a single direction is connected in parallel relation to a device for short-circuiting or shunting the current of the winding at the moment of the current maximum. This device may be constituted by a diode poled for blocking action in the first half-wave of the capacitor discharge. In some cases, such a diode may also be substituted by a spark gap which is ignited at the current maximum of the induction winding. Further suitable for this purpose is a galvanomagnetic semiconducting resistor or a spark gap subjected to controlled magnetic blowing, so that the resistance value of the particular device depends upon the intensity of the current flowing through the induction winding.

According to a further feature of the invention, two induction windings are parallel connected to a capacitor through respective diodes which are so poled that one of them acts in the blocking sense during the even-numbered half-waves of the capacitor discharge, whereas the other rectifier will block during the odd-numbered half-waves. Applicable in lieu of such two diodes are also respective galvanomagnetic resistors or spark gaps subjected to magnetically controlled blowing. The galvanomagnetic resistors are preferably mounted in a magnetic circuit energized simultaneously with the induction windings and suitably pre-magnetized. Pre-magnetization need not be used, if means are provided for magnetically controlling the resistors at one-half the discharging frequency of the capacitor whose electrical energy serves for exciting the induction windings.

The above-mentioned and more specific objects, advantages and features of the invention will be apparent from, and will be described in, the following in conjunction with embodiments of systems according to the invention illustrated by way of example on the accompanying drawings.

FIG. 5 is a schematic circuit diagram of an apparatus for dynamic plasma confinement comprising three induction windings of which two are individually connected with the energizing capacitor through a full-wave rectifier bridge network.

FIG. 6 is the circuit diagram of a plasma accelerator equipped with two induction windings which are connected through respective diodes to the same capacitor.

FIG. 7 is the circuit diagram of another dynamic plasma confining apparatus, designed and operating on the same principles as the system shown in FIG. 6.

FIGS. 12 and 13 show schematically respective embodiments relating to the circuit diagrams of FIGS. 10 and 11.

FIG. 14 illustrates schematically the principle of a spark gap subjected to magnetically controlled blowing action.

FIG. 15 is the schematic circuit diagram of apparatus for dynamic plasma confinement corresponding essentially to FIG. 9 but equipped with magnetically controlled spark gaps or galvanomagnetic resistors in lieu of the diodes shown in FIG. 9.

FIG. 16 is an explanatory current-time graph relating to FIG. 15.

FIG. 17 is a schematic circuit diagram relating to the short-circuiting of the induction-winding current by ignition of a spark gap at the current maximum.

FIG. 18 is an explanatory current-time and voltage-time graph relating to FIG. 17.

FIGS. 19 and 20 are respective circuit diagrams of equipment for short-circuiting the induction-winding under control by galvanomagnetic resistors or magnetically controlled spark gaps; and FIG. 21 is a circuit diagram relating to the short-circuiting of the induction-winding at the current maximum by a diode connected parallel to the induction winding.

For an explanation of the phenomena involved in apparatus according to the invention, as well as for pertinent literature, reference may be had to the above-mentioned Patent No. 3,270,236. The following description, therefore, is mainly directed to the plasma-technological equipment and the appertaining electrical circuitry with emphasis upon the novel features of the present invention as compared with the apparatus and systems known from the patent.

Figure 1:
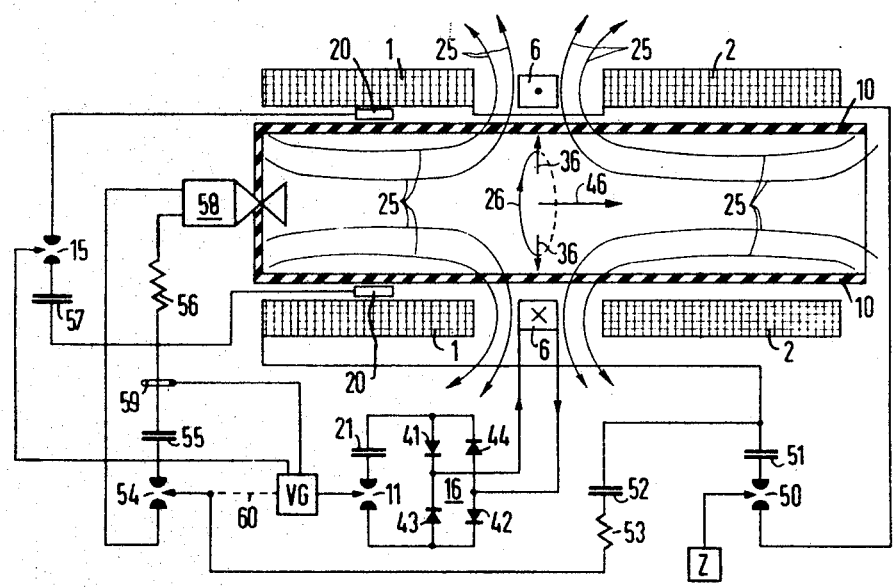
FIG. 1 shows schematically and partly in section a plasma accelerator with an energizing system comprising a capacitor connected through a full-wave rectifier bridge to the induction winding of the apparatus.

Referring to FIG. 1, there is shown a plasma accelerator which comprises a straight tubular vessel 10 of insulating material such as quartz glass. Wound coaxially upon the tubular vessel 10 is a centrally located induction winding 6 of low inductivity (theta coil). Located on opposite sides of the winding 6 and in spaced relation thereto are two field coils 1 and 2 which are wound in mutually opposed winding sense so as to produce a cusp field, represented by some field lines 25, when the two windings are simultaneously traversed by current. The induction winding 6 is to be excited during energizing periods of the field coils 1, 2 by intensive current pulses of short duration. For this purpose, the low-induction winding 6 is connected to a capacitor 21 through a full-wave rectifier bridge (Graetz) network 16.

For operating the equipment according to FIG. 1, a spark gap 50 is ignited by means of an ignition device Z so that the capacitor 51 will discharge through the field coils 1 and 2. The capacitor 51 in this as well as in all of the following embodiments may be constituted by a battery of many individual capacitors. The energization of coils 1 and 2 produces in the intermediate space the cusp field 25 which is directed radially outwardly in the plane of the induction winding 6. This is indicated in FIG. 1 by two arrows 36.

Simultaneously with the excitation of field coils 1 and 2, a spark gap 54 is ignited, preferably and as shown through a capacitor 52 and a resistor 53. This causes a capacitor 55 to discharge preferably through a resistor 56 and to energize a valve 58 which blows a sudden surge or shock of gas, for example hydrogen, into the previously evacuated tube 10. In the tubular vessel the gas rushes from the left toward the right.

The discharge of the capacitor 55 also acts upon a Rogowski belt (current transformer) 59 which triggers a delay stage VG. The stage VG ignites a spark gap 15 so that the capacitor 57 discharges through a pre-ionizing coil 20. The coil 20 pre-ionizes the gas blown into the tube 10 and converts it into plasma. Thereafter, the delay stage VG ignites the spark gap 11 at the moment at which the plasma arrives in the plane of the induction winding 6. After ignition of the spark gap 11, the capacitor 21 is discharged through the induction winding 6 which receives a unidirectional pulse from the network 16 composed of four rectifier diodes 41 to 44 in full-wave bridge connection.

Assume that initially the upper electrode of capacitor 21 was at a positive potential. Then the current during the first half-wave of the capacitor discharge passes through the diode 41, the induction winding 6, the diode 42 and back to the capacitor 21. In the second half-wave, the current flows from the lower capacitor electrode or diode 43, winding 6 and diode 44 to the upper capacitor electrode. Consequently, the induction winding 6 is traversed by current in only one direction during the interval of the oscillating capacitor discharge.

Due to the excitation of the induction winding 6 by the pulse current, there occurs an electrical ring current 26 within the insulating tube 10 and the plane of winding 6. The winding 6, for example, may be traversed by current in the direction indicated by a dot and an x. The ring current flows within the plasma which has advanced up to the plane of the winding 6. Due to the Lorentz force, proportional to the vector product of ring current 26 and magnetic field 36, the plasma is accelerated in the direction of the arrow 46 and is thus ejected out of the plane of the induction winding 6.

If plasma has been entered into the device according to FIG. 1 in some manner other than described above, the valve 58 and the appertaining portion of the circuitry are superfluous. In this case the delay stage VG may be directly triggered by the capacitor discharge 51 such as by the illustrated jumper connection 60.

Figure 2:
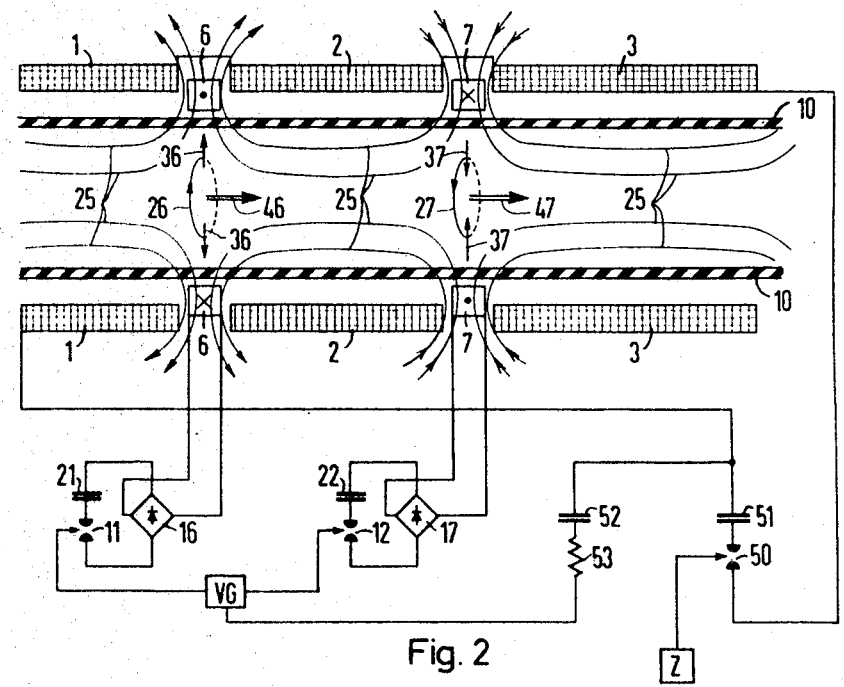
FIG. 2 illustrates a similar plasma accelerator system equipped with two induction windings corresponding to FIG. 1.

Shown in FIG. 2 is a plasma accelerator equipped with two induction windings 6 and 7, each corresponding to the winding 6 in FIG. 1. In this embodiment the insulating tube 10 is surrounded not only by the two field coils 1 and 2 described above but by an additional field coil 3. The circuitry of the induction winding 6 in FIG. 2 is identical with the corresponding circuit portion of FIG. 1, corresponding components in the two illustrations being designated by the same reference character.

For simplicity, the valve 58 with the appertaining circuit portion is not illustrated in FIG. 2. The induction winding 6 is energized through a full-wave rectifier bridge 16, shown only symbolically in FIG. 2, in the same manner as explained above with reference to FIG. 1.

After an interval of time, corresponding to the travel time of the plasma from induction winding 6 to induction winding 7 and, as the case may be, to some additional accumulating time in the cusp field 37, the delay stage VG ignites the spark gap 12. Now the capacitor 22 discharges through the rectifier bridge 17 and through the induction winding 7. The rectifier network 17 is a duplicate of network 16. The windings 6 and 7 differ from each other only in being poled in opposition to each other. This poling of winding 7 is important because the plasma in apparatus according to FIG. 2 is to be accelerated also from the plane of the winding 7 to the right (arrow 47), whereas the cusp field 37 in the plane of winding 7 is directly radially inwardly.

Figure 3:
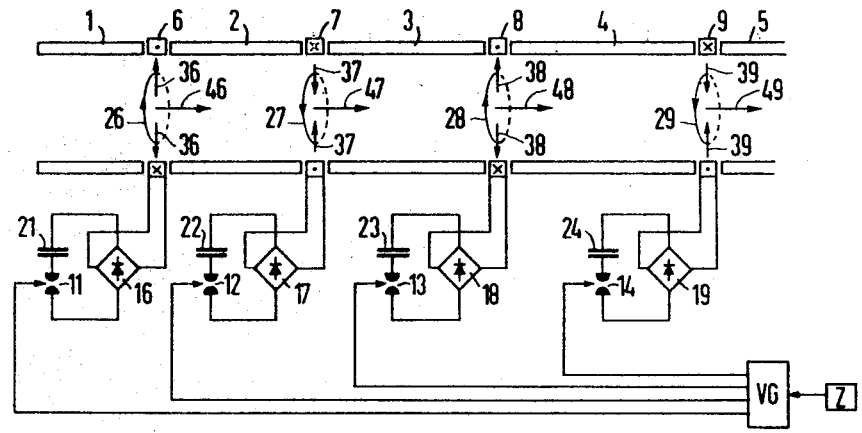
FIG. 3 is a schematic circuit diagram of another plasma accelerator with four induction windings corresponding to FIG. 2.

FIG. 3 shows a plasma accelerator with four accelerating stages. For the purpose of acceleration, the plasma must be accelerated in each of the four cusp field stages in the same direction 46 to 49 from the left to the right. This required adjacent induction windings 6 to 9 to be poled in opposition to each other. Since the traveling speed of the plasma increases at is becomes accelerated in the four successive stages, it is generally advantageous to give the field coils 1 to 5 a progressively greater length from coil to coil in the direction from the left to the right. During the oscillating discharge of the respective capacitors 21 to 24, each individual induction winding 6 to 9 is traversed by current in only one direction. If an individual plasma is to be incrementally accelerated from winding 6 to winding 9, the delay stage VG may successively ignite the spark gaps 11 to 14 in suitable intervals of time, so that the capacitors 21 to 24 will discharge successively through the respective rectifying networks 16 to 19 into the respective induction windings 6 to 9.

Figure 4:
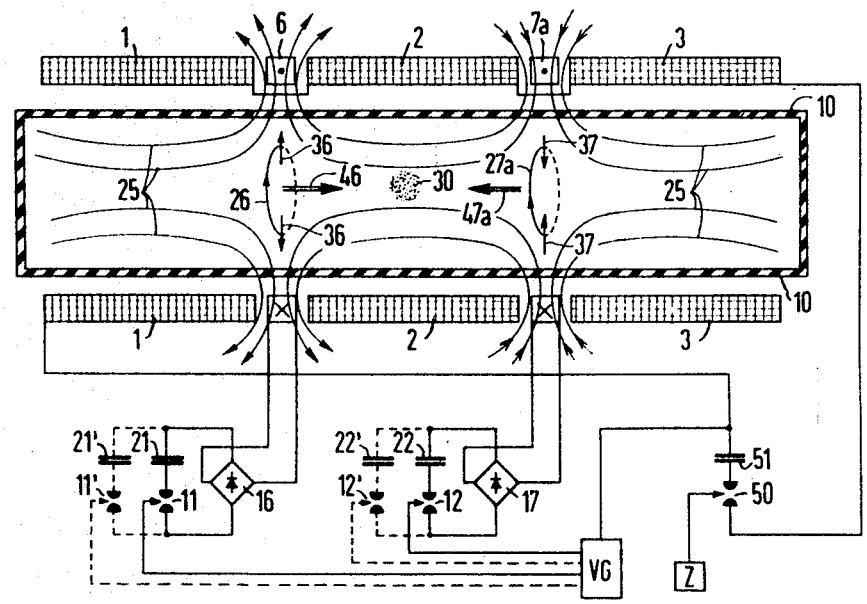
FIG. 4 illustrates schematically and partly in section an apparatus for dynamical plasma confinement with the aid of two induction windings corresponding to FIG. 1.

FIG. 4 shows an apparatus for dynamic plasma confinement which is equipped with two induction windings 6 and 7a, wound in the same winding sense about the insulating tube 10 between the field coils 1, 2 and 2, 3. In FIG. 4 as well as in the following illustrations, the components functionally similar to those already described with reference to the preceding examples are designated by the same respective reference characters. A component which differs from analogous components in other illustrations only by the inversion of its poling or direction is designated in FIG. 4 and following by the suffix a.

As indicated in FIG. 4, the ring current 27a in the plasma, and the cusp field 37 having a radially inwardly directed component, accelerate the plasma 30 from the plane of induction winding 7a in the direction 47a, or the same coaction reflects the plasma back into this direction. As the accelerated plasma becomes decelerated in each of the cusp fields 36 and 37, it is incrementally heated to a higher temperature. FIG. 4 further shows that for a rapid ignition sequence of the spark gaps in the excitation circuits for windings 6, 7a, there are alternately activated the spark gaps 11 and 11', or 12 and 12', or any desired further spark gaps. In this manner, the individual spark gaps can be deionized between successive ignitions. This affords recharging in the intermediate interval of time the respective capacitors 21 and 21', or 22 and 22', or any further capacitors with which the system may be provided.

FIG. 5 shows an apparatus for the dynamic confinement of plasma operating with three induction windings 6, 70 and 8a. As to circuit connections and performance the windings 6 and 8a correspond to the windings 6 and 7a of FIG. 4, except that the two windings are wound in mutually opposed winding sense. This is necessary because in the plane of winding 8a the cusp field 38 is directed radially outwardly, and so is the cusp field 36 of winding 6. After ignition of the spark gap 13, the discharge of capacitor 23 causes the plasma to be accelerated out of the plane of winding 8a due to the coaction of the ring current 28 with the cusp field 38, the acceleration being in the direction indicated by an arrow 48a. In contrast to the operation of the induction windings of the preceding embodiments, the ignition of the spark gap 71 causes a capacitor 72 to discharge through the winding 70 in such a manner that the current of the winding 70 oscillates. As a result, the plasma is alternately accelerated in opposing directions 75 and 76 away from the plane of the middle winding 70 due to the coaction of the inwardly directed cusp field 37 with the ring current 73 oscillating within the plasma.

FIG. 6 relates to a plasma accelerator with two induction windings 6 and 7 connected through respective diodes 63 and 64 to one and the same capacitor 62. Relative to the effect upon the plasma, this system corresponds to that of FIG. 2. Assume that the capacitor 62, upon ignition of the spark gap 61, will first discharge through the diode 63 into the induction winding 6. In the next following half-wave of the discharge current, the diode 63 will block and the diode 64 conducts current so that the other induction winding 7 is now traversed by current.

FIG. 7 illustrates a system for dynamic plasma confinement in which two induction windings 6 and 7a form part of a circuit system similar to that of FIG. 6, except that the poling of winding 7a is opposed to that of the winding 7. In this case, therefore, the plasma is reflected between the two windings 6 and 7a, thus being incrementally heated to higher temperatures. Aside from the windings 6 and 7a, the same insulating tube may be provided with further induction windings, for example the illustrated windings 8a and 9a, each located between a pair of the field coils 1 to 5. The induction windings 8a and 9a may be connected in the same circuit as the one shown for the windings 6 and 7a. The windings 8a and 9a must be so poled that the respective ring currents 28a and 29a, in coaction with the cusp fields 38 and 39, accelerate the plasma in the indicated directions 48a and 49a.

Figure 8:
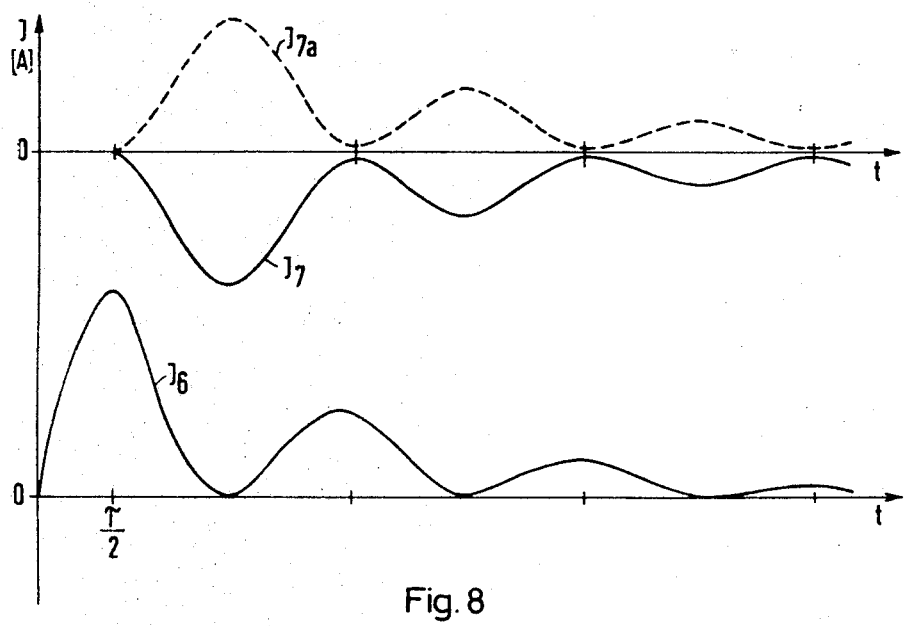
FIG. 8 is an explanatory current-time graph relating to the two induction windings connected through respective diodes to a capacitor according to FIG. 6 or FIG. 7.

FIG. 8 is a current-time diagram for two induction windings 6 and 7 (7a) which according to FIGS. 6 and 7 are connected through diodes 63 and 64 to a capacitor 62. The ordinate indicates the currents $I_6$ and $I_7$ (or $I_{7a}$) flowing in the respective induction windings 6 and 7 (7a), for example in Amps. The abscissa indicates time ($t$), for example in microseconds. It will be seen from the diagram that at the end of the first half-wave interval $\tau/2$ the current through the winding 6 has reached its maximum and that at this moment the current $I_7$ (or $I_{7a}$) through the winding 7 (or 7a) commences to flow. It is further apparent that the direction of current flow in each winding does not change at any time.

Figure 9:
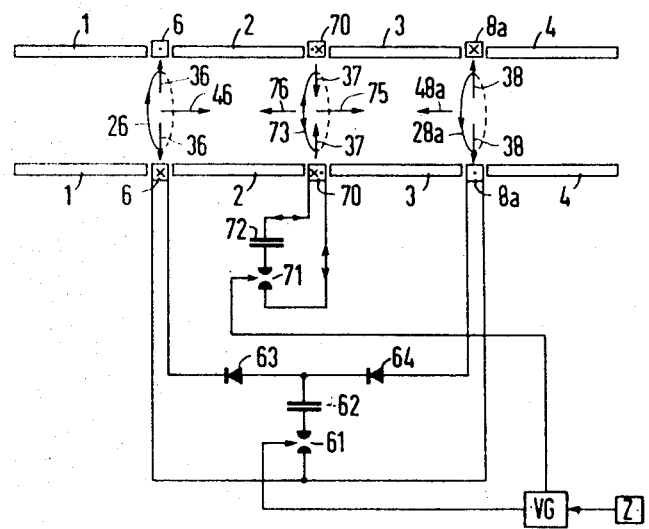
FIG. 9 is a schematic circuit diagram relating to an apparatus for dynamic plasma confinement, equipped with three induction windings of which two are electrically connected in the manner shown in FIG. 7.

The apparatus shown in FIG. 9 serves for dynamic confinement of plasma with the aid of three induction windings 6, 70 and 8a which, as to their effect upon the plasma, correspond to the three windings of FIG. 5. The system of FIG. 9 differs only in that the two full-wave rectifier networks of FIG. 5 are substituted by a diode network according to FIG. 6.

Figures 10, 11:
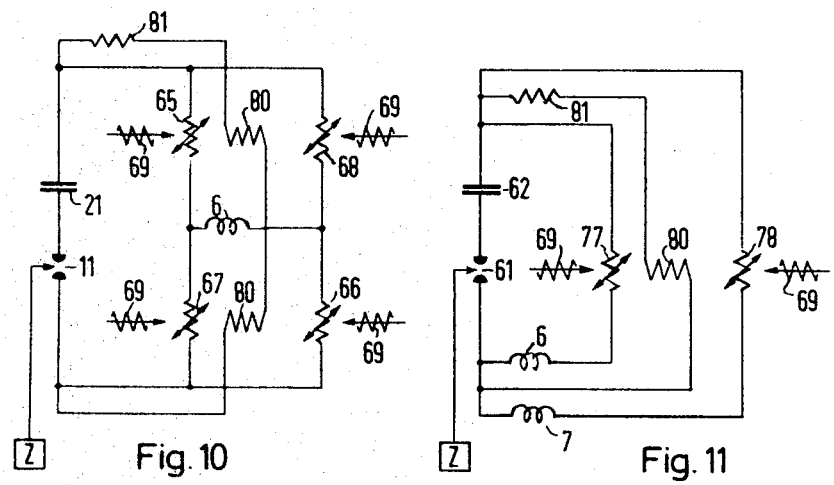
FIG. 10 is the schematic circuit diagram of galvanomagnetic semiconducting resistors employed in lieu of rectifiers according to FIG. 1.
FIG. 11 is the schematic diagram of galvanomagnetic semiconducting resistors to be used in lieu of diodes according to FIG. 6.

FIG. 10 shows the circuit diagram for an induction winding, for example the winding 6 shown in FIG. 1. A bridge (Graetz) network of four galvanomagnetic semi-conducting resistors 65 to 68 is connected between the induction winding 6 and the capacitor 21 which discharges upon ignition of the spark gap 11. The galvanomagnetic resistors are premagnetized by means of constant magnetic fields 69. Connected in parallel relation to the input diagonal of the bridge network (and hence parallel to the capacitor 21 with the spark gap 11) is a magnet coil 80 in series with a resistor 81. The magnet coil 80 produces a variable magnetic field to which the galvanomagnetic resistors 65 to 68 are subjected in addition to the constant bias magnetization already mentioned. The resistor 81 serves to limit the current through the magnet coil 80 so that the excitation current of the induction winding 6 will not be excessively weakened. The coaction of the individual components in this circuit will be explained hereinafter with reference to FIG. 12.

FIG. 11 illustrates another circuit diagram of galvanomagnetic resistors 77 and 78 which take the place of the diodes 63 and 64 in a system otherwise corresponding to that of FIG. 6. The galvanomagnetic resistors 77 and 78, as well as the corresponding galvanomagnetic resistors described with reference to FIG. 10, are premagnetized by constant magnetic fields 69 and are placed into the field of a magnetic coil 80 connected in parallel relation to the capacitor 62. Details of the embodiment according to FIG. 11 will be described hereinafter with reference to FIG. 13.

Figure 12:
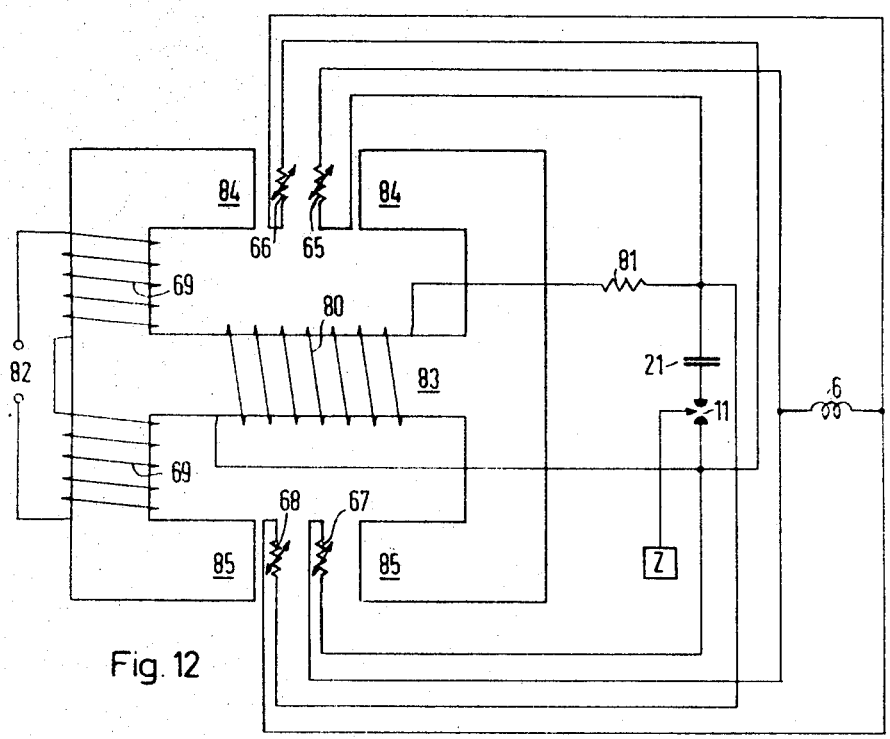

FIG. 12 illustrates by way of example an embodiment of a magnetic device for circuitry as schematically shown in FIG. 10. The magnetic coil 80 is wound about the core portion of a magnet having two pairs of pole shoes 84 and 85. The galvanomagnetic resistors 65 and 66 are placed into the air gap between the pole shoes 84; and the galvanomagnetic resistors 67 and 68 are placed into the air gap between the pole shoes 85. The magnetic circuit carries a premagnetizing winding 69 connected at terminals 82 to a source of constant current and arranged to impose upon the two pairs of galvanomagnetic resistors a premagnetizing bias of mutually opposed magnetic polarities. Depending upon the direction in which the core 83 is magnetized at a time by the coil 80, the two resistors 65, 66 have a high resistance and the two resistors 67, 68 have a low resistance or vice versa. The resultant operation of the bridge network of galvanomagnetic resistors 65 to 68, therefore, is the same as that of the rectifiers 41 to 44 in FIG. 1. The galvanomagnetic resistors 65 to 68 may be substituted by respective spark gaps which are subjected to magnetic blowing by a magnet system otherwise corresponding to the one shown in FIG. 12. That is, the four spark gaps are to be arranged in a bridge network corresponding to that of the galvanomagnetic resistors, and are subjected pairwise to the two opposingly biased air gaps of the magnetic system.

FIG. 13 shows an embodiment of a magnetic device for a circuit according to FIG. 11. This embodiment has a design analogous to that of FIG. 12, except that only one galvanomagnetic resistor 77 or 78 is located in the air gap of each of the pole-shoe pairs 84 and 85. In this case, too, the galvanomagnetic resistors may be substituted by spark gaps subjected to magnetically controlled blowing, the control being effected by means of the magnet system shown in FIG. 13.

The principle of such a magnetically controlled air gap is schematically indicated in FIG 14. Normally, the spark gap will discharge as indicated by the lines 86. After a magnetic field is switched on, for example, a magnetic field whose lines of force extend perpendicular to the plane of illustration, as is indicated at 87, the arc or spark path is deflected toward one side as shown at 88 so that the resistance of the spark gap increases. As explained, such a spark gap may be connected into a circuit according to FIG. 12 or 13 in lieu of each individual galvanomagnetic resistor, the magnetic blowing field being furnished by the field in the air gap in which the spark gap will then be located. Such magnetically controlled spark gaps are sometimes preferable for the purposes of the present invention because they can be readily rated for high current intensities.

Thus, FIG. 15 shows a system corresponding to FIG.

9, except that the diodes 63 and 64 are substituted by magnetically controlled spark gaps 91 and 92. It will be understood that each of these spark gaps may also be substituted by a galvanomagnetic resistor. The spark gaps 91 and 92 are subjected to the fields of magnetic coils 97 and 98. These form part of oscillatory circuits which comprise respective capacitors 95 and 96 and are put in operation by ignition of respective spark gaps 93 and 94 under control by a time delay stage 74. The time delay stage 74 is shown connected by a Rogowski belt 89 with the discharge circuit of the capacitor 62. In lieu thereof, a jumper may be used for connecting the delay stage 74 directly to the ignition device Z, this being indicated by a jumper connection 90. Instead of using a jumper connection 90, a selector switch may have its movable selector contact connected to the time delay device 74 so that it can be selectively set for connecting the delay stage either with the Rogowski belt or with the ignition device Z. The same applies to the jumper connection 60 in FIG. 1.

To make certain that each of the induction windings 6 and 8a is each traversed by current in only one direction during the oscillating discharge of the capacitor 62, it is advisable to rate the natural frequencies of the two tank circuits of magnetic coils 79 and 98 for one-half the frequency value as the discharging frequency of the capacitor 62.

The operation of the system according to FIG. 15 will be explained with reference to FIG. 16. The diagram indicates current along the ordinate, for example in Amps, and time ($t$) along the abscissa, for example in microseconds. The curve $I_0$ represents the oscillating current flowing during discharge of the capacitor 62, for example between the capacitor 62 and the point 99 in FIG. 15. The current curves $I_I$ and $I_{II}$ relate to the two tank circuits of the magnet coils 97 and 98. For simplicity, the curves are shown without taking damping effects into account, and the amplitude ratio of $I_0$ to $I_I$ adn $I_{II}$ is not in accordance with the true scale.

The components 91 and 92 (spark gaps or galvanomagnetic resistors) in the system of FIG. 15 are so rated that they alternately block the current $I_0$ during an interval of time in which the curents $I_I$ or $I_{II}$ have maximal values. The latter are indicated on curves $I_I$ and $I_{II}$ in FIG. 16 by heavy lines. It follows, for example, from FIG. 16, that the magnetically controlled spark gap 92 (or the corresponding galvanomagnetic resistor) has a high resistance during the first half-wave of the current $I_0$ due to the relatively high intensity of the current $I_{II}$. Consequently, during this half-wave of current $I_0$, the latter current will flow through the induction winding 6. During the second half-wave the conditions are reversed. In this half-wave of current $I_0$, the current $I_I$ reaches its maximum so that the spark gap 91 (or the corresponding galvanomagnetic resistor) is high-ohmic and the current $I_0$ will flow through the winding 8a.

Illustrated in FIG. 17 is a system with an induction winding 6 whose current is short-circuited at the current maximum by ignition of a spark gap 101. As to its effect, this circuit corresponds to that of FIG. 1, the induction winding 6 being traversed by current in only one direction during the oscillating discharge of the capacitor 21. The spark gap 101 is shown connected to the circuit of induction winding 6 and capacitor 21 through a time delay stage VG with the aid of a Rogowski belt 100.

The functioning of the circuit according to FIG. 17 will be explained with reference to FIG 18. The upper diagram in FIG. 18 represents the time curve of the current $I$ in induction winding 6, for example in Amps, and the lower diagram in FIG. 18 indicates the time curve of the voltage, for example in Volt. In both mutually correlated diagrams of FIG. 18 the abscissa represents time ($t$), for example in microsecond. Without provision of the spark gap 101, the current $I$ and the voltage $U$ would have the respective time curves shown by broken lines. However, when the spark gap 101 is ignited at the current maximum $I_M$, that is, after elapse of a quarter period ($\tau/4$), the capacitor 21 will not charge in the inverse direction. Consequently, the voltage at the capacitor, which had the zero value at the current maximum (namely at $\tau/4$), remains constant at the zero value. From this moment ($\tau/4$) on, the current will flow substantially only in the circuit containing the induction winding 6 and the spark gap 101. This short-circuit current decays in accordance with an e-function which is proportional to exp ($-t \cdot R/L$), in which R denotes the resistance and L the induction of the circuit containing the winding 6 and the spark gap 101. To make certain that upon occurrence of the short circuit the current will actually flow through the winding 6, it is advisable to keep the resistance of the winding circuit as low as possible.

FIGS. 19 and 20 exemplify embodiments of circuits for short-circuiting the current of induction winding 6 by magnetic control of galvanomagnetic resistors 103 or magnetically controlled spark gaps of the type described above with reference to FIG. 14. The reference characters in FIGS. 19 and 20 correspond to those of FIG. 17 relative to functionally similar components.

FIG. 19 relates to the use of galvanomagnetic resistors which are premagnetized by a magnetic field 104. As long as only the premagnetizing bias acts upon the resistor 102 (or a corresponding magnetically controllable spark gap), the resistance of this component is high. However, when the magnet coil 105 is simultaneously put in operation so that its magnetic field acts in opposition to the premagnetization, the component 103 becomes low-ohmic. The moment at which the coil 105 is switched on, therefore, coincides with the moment at which the spark gap 101 according to FIG. 17 is to be ignited. For example, and as illustrated, the magnet coil 105 may be connected in an oscillating circuit with a capacitor 106 discharged by ignition of a spark gap 107.

For operation without premagnetization, as represented in FIG. 20, the magnet coil 105 is kept in operation until the current through the induction winding 106 has reached its maximum. This may be done, for example, by short-circuiting at the desired moment the voltage source 108 which energizes the coil 105, the short-circuiting being effected by means of a spark gap 107. It will again be understood that in a circuit of the type exemplified by FIG. 20, the magnetically controlled spark gap 102 may be substituted by a galvanomagnetic resistor.

A particularly simple circuit for short-circuiting the current through the induction winding 6 is represented in FIG. 21. A diode 109 is connected parallel to the induction winding 6. Assume that the diode will block during the first half-wave of the capacitor discharge. Then the diode will become conducting after the zero passage of the voltage at the capacitor, which occurs at the current maximum of the induction winding 6. When the diode 109 has become conducting, the current of the induction winding 6 will flow through the parallel circuit of the diode 109, provided the resistance of this parallel circuit, including the diode, is smaller than the resistance of the circuit containing the spark gap 11 and the capacitor 21.

In the cusp fields of all of the embodiments described in the foregoing, the the plasma may be accumulated prior to the emission or ejection during a collecting phase lasting a few microseconds. During such pre-collection, the plasma is heated, and the heating is due to the fact that the kinetic energy of the plasma in the collecting phase is converted to heat to a large extent.

We claim:

1. Apparatus for electromagnetic control of plasmoids, comprising a tubular vessel of electrically insulating material which contains gas when in operation, at least three magnetic field coils magnetically opposed to each other and surrounding said tubular vessel in coaxial relation thereto and mutually spaced axially for producing between each other a magnetic field of cusp configuration, and at least two low-induction windings coaxially surrounding said tubular vessel and interposed respectively between each two of said field coils, said windings being magnetically poled in opposition to each other, in combination with an energizing system comprising electric circuit means connected to said field coils, capacitor means, control means for periodically causing oscillating discharges of said capacitor means, and capacitor discharge circuit means connected to said capacitor means and having an asymmetrically conducting portion which includes said induction windings so that said windings are traversed by unidirectional current during oscillatory discharge of said capacitor means.

2. In apparatus according to claim 1, said two induction windings having the same winding sense, and said two circuit portions of said respective induction windings having mutually opposed polarization so that the current flow direction in one of said windings is opposed to that in the other.

3. In apparatus according to claim 1, each of said two induction windings having a winding sense opposed to that of said other induction winding so that both said windings are traversed by respective currents of the same direction during said oscillating discharges.

4. Apparatus for electromagnetic control of plasmoids, comprising a tubular vessel of electrically insulating material which contains gas when in operation, at least three magnetic field coils magnetically opposed to each other and surrounding said tubular vessel in coaxial relation thereto and mutually spaced axially for producing between each other a magnetic field of cusp configuration, and at least two low-induction windings coaxially surrounding said tubular vessel and interposed respectively between each two of said field coils, said windings having the same magnetic poling, in combination with an energizing system comprising electric circuit means connected to said field coils, capacitor means, control means for periodically causing oscillating discharges of said capacitor means, and capacitor discharge circuit means connected to said capacitor means and having an asymmetrically conducing portion which includes said induction windings so that said windings are traversed by unidirectional current during oscillatory discharge of said capacitor means.

5. Apparatus for electromagnetic control of plasmoids, comprising a tubular vessel of electrically insulating material which contains gas when in operation, at least two magnetic field coils magnetically opposed to each other and surrounding said tubular vessel in coaxial relation thereto and mutually spaced axially for producing between each other a magnetic field of cusp configuration, and at least three low-induction windings coaxially surrounding said tubular vessel, one of said windings being interposed between said two field coils and the other two at respective outer ends of said coils so that said windings are axially spaced from each other on said tubular vessel, the two outer ones of said windings having mutually opposed magnetic polarities, in combination with an energizing system comprising electric circuit means connected to said field coils, capacitor means, control means for periodically causing oscillating discharges of said capacitor means, and capacitor discharge circuit means connected to said capacitor means and having an asymmetrically conducting portion which includes said induction windings so that said windings are traversed by unidirectional current during oscillatory discharge of said capacitor means.

6. Apparatus according to claim 4 for acceleration and dynamic confinement of plasmoids, comprising at least one additional induction coil coaxially surrounding said tubular vessel on at least one side of said two equipolar induction windings, circuit means connected to said additional windings for passing therethrough a unidirectional current simultaneously with that of said equipolar windings, and said additional winding having a magnetic poling opposed to that of said two equipolar windings.

7. Apparatus for electromagnetic control of plasmoids, comprising a tubular vessel of electrically insulating material which contains gas when in operation, at least two magnetic field coils magnetically opposed to each other and surrounding said tubular vessel in coaxial relation thereto and mutually spaced axially for producing between each other a magnetic field of cusp configuration, and at least one low-induction winding coaxially surrounding said tubular vessel between said two field coils, in combination with an energizing system comprising electric circuit means connected to said field coils, capacitor means, control means for periodically causing oscillating discharges of said capacitor means, and a capacitor discharge circuit connected to said capacitor means and having an asymmetrically conducting portion which includes said induction winding so that said winding is traversed by unidirectional current during oscillatory discharge of said capacitor means, said asymmetrically conducting circuit portion for said induction winding comprising a full-wave bridge network having an input connected to said capacitor means and having an output connected to said induction winding.

8. In apparatus according to claim 7, said bridge network being formed of diodes.

9. In apparatus according to claim 7, said bridge network being formed of variable resistance components, and means for controlling the resistance variation of said components in synchronism with said capacitor oscillating discharges.

10. In apparatus according to claim 7, said bridge network being formed of four galvanomagnetic resistors, magnetic circuit means having a field in which said resistors are mounted, control means inductively coupled with said magnetic circuit means and connected to said energizing system for varying the resistance of said galvanomagnetic resistors in synchronism with said capacitor oscillating discharges, and premagnetizing means also coupled with said magnetic circuit means so as to magnetically bias said resistors pairwise in mutually opposed sense to alternately increase and decrease their resistance in mutually inverse relation during successive half-waves of said discharges.

11. In apparatus according to claim 7, said bridge network being formed of four magnetically controllable spark gaps, magnetic circuit means having field regions in which said spark gaps are situated, control means inductively coupled with said magnetic circuit means and connected to said energizing system for varying the resistance of said spark gaps in synchronism with said capacitor oscillating discharges, and premagnetizing means also coupled with said magnetic circuit means so as to magnetically bias said spark gaps pairwise in mutually opposed sense to alternately increase and decrease their resistance in mutually inverse relation during successive half-wave of said discharges.

12. Apparatus for electromagnetic control of plasmoids, comprising a tubular vessel of electrically insulating material which contains gas when in operation, at least two magnetic field coils magnetically opposed to each other and surrounding said tubular vessel in coaxial relation thereto and mutually spaced axially for producing between each other a magnetic field of cusp configuration, and at least one low-induction winding coaxially surrounding said tubular vessel between said two field coils, in combination with an energizing system comprising electric circuit means connected to said field coils, capacitor means, control means for periodically causing oscillating discharges of said capacitor means, and a capacitor discharge circuit connected to said capacitor means and having an asymmetrically conducting portion which includes said induction winding so that said winding is traversed by unidirectional current during oscillatory discharge of said capacitor means, and further comprising a circuit connected in parallel to said induction winding and having control means for short-circuiting the winding current upon occurrence of the maximum of said current.

13. In apparatus according to claim 12, said short-circuiting control means being formed substantially of a diode poled for blocking action relative to the first half-wave of said capacitor oscillating discharge.

14. In apparatus according to claim 12, said short-circuiting control means being formed substantially of a spark gap and having means for igniting said spark gap in dependence upon occurrence of said current maximum.

15. In apparatus according to claim 12, said short-circuiting control means being formed substantially of a magnetically controllable resistance device having means for varying the resistance of said device in dependence upon occurrence of said current maximum.

16. Apparatus for electromagnetic control of plasmoids, comprising a tubular vessel of electrically insulating material which contains gas when in operation, at least three magnetic field coils magnetically opposed to each other and surrounding said tubular vessel in coaxial relation thereto and mutually spaced axially for producing between each other a magnetic field of cusp configuration, and at least two low-induction windings coaxially surrounding said tubular vessel between said two field coils, in combination with an energizing system comprising electric circuit means connected to said field coils, capacitor means, control means for periodically causing oscillating discharges of said capacitor means, and capacitor discharge circuit means connected to said capacitor means and having asymmetrically conducting portions including said induction windings, respectively, so that said windings are traversed by unidirectional current during oscillatory discharge of said capacitor means, said two induction windings having the same capacitor means in common and being connected in parallel with each other to said capacitor means, said asymmetrically conducting circuit portions of each of said windings comprising a diode poled in opposition to the diode of the other circuit portion, one of said diodes being conductive during even-numbered half-waves and the other during odd-numbered half-waves of said capacitor oscillating discharges.

17. Apparatus for electromagnetic control of plasmoids, comprising a tubular vessel of electrically insulating material which contains gas when in operation, at least three magnetic field coils magnetically opposed to each other and surrounding said tubular vessel in coaxial relation thereto and mutually spaced axially for producing between each other a magnetic field of cusp configuration, and at least two low-induction windings coaxially surounding said tubular vessel between said two field coils, in combination with an energizing system comprising electric circuit means connected to said field coils, capacitor means, control means for periodically causing oscillating discharges of said capacitor means, and capacitor discharge circuit means connected to said capacitor means and having asymmetrically conducting portions including said induction windings, respectively, so that said windings are traversed by unidirectional current during oscillatory discharge of said capacitor means said two induction windings having the same capacitor means in common and being connected in parallel with each other to said capacitor means, said asymmetrically conducting circuit portions of each of said windings comprising a magnetically controllable resistance device having means for varying the resistance of said device in dependence upon occurrence of said current maximum so that said two devices change in mutually inverse relation between high and low resistance from half-wave to half-wave of said oscillating discharges.

18. In apparatus according to claim 17, said resistance devices being galvanomagnetic resistors and comprising magnetic circuit means having a field in which said resistors are situated, control means inductively coupled with said magnetic circuit means and connected to said energizing system for varying the resistance of said galvanomagnetic resistors in synchronism with said capacitor oscillating discharges, and premagnetizing means also coupled with said magnetic circuit means so as to magnetically bias said resistors in mutually opposed sense to alternately increase and decrease their resistance in mutually inverse relation during successive half-waves of said discharges.

19. In apparatus according to claim 17, said control means comprising circuit means for magnetically varying said resistance of said devices at one-half the frequency of said capacitor discharges.

References Cited

UNITED STATES PATENTS

| | | | |
|---|---|---|---|
| 3,166,477 | 1/1965 | Leboutet | 315—111 X |
| 3,270,236 | 8/1966 | Koller et al. | 313—153 |

JAMES W. LAWRENCE, Primary Examiner

PALMER C. DEMEO, Assistant Examiner

U.S. Cl. X.R.

313—153, 231; 315—111